United States Patent Office 3,461,209
Patented Aug. 12, 1969

3,461,209
SEED PROTECTANT COMPOSITIONS CONTAINING MIXTURES OF 3,3,4,4-TETRACHLOROTETRAHYDROTHIOPHENE WITH OTHER FUNGICIDES
Heinz Frensch and Helmut Goebel, Frankfurt am Main, and Kurt Hartel, Hofheim, Taunus, Germany, assignors to Farbwerke Hoechst Aktiengesellschaft vormals Meister Lucius & Brüning, Frankfurt am Main, Germany, a corporation of Germany
No Drawing. Continuation-in-part of application Ser. No. 483,314, Aug. 27, 1965. This application Aug. 23, 1966, Ser. No. 574,310
Claims priority, application Germany, Sept. 1, 1964, F 43,873; Jan. 17, 1966, F 48,190
Int. Cl. A01n 21/00, 9/12
U.S. Cl. 424—274                13 Claims

ABSTRACT OF THE DISCLOSURE

Seed protectant composition containing, as the active ingredients, a mixture of (A) 3,3,4,4-tetrachlorotetrahydrothiophene-1,1-dioxide with (B) pentachloronitrobenzene, tetrachloronitrobenzene, tetramethylthiuramdisulfide, N - trichloromethylmercapto - tetrahydrophthalimide, hexachlorobenzene, manganese ethylene-bis-dithiocarbamate, zinc ethylene-bis-dithiocarbamate or a combination thereof, components A and B being present in a weight ratio of 1:1 to 1:10.

---

This application is a continuation-in-part of application Ser. No. 483,314 filed Aug. 27, 1965, now abandoned.

The present invention relates to mercury-free seed treating agents.

For protecting against various fungus diseases, for example Tilletia caries, Fusarium disease or *Rhizoktonia solani*, seeds are nowadays generally treated with mercury-containing preparations. Because of the objectionable toxicological properties of such preparations, especially of organic mercury compounds also used for seed treatment, attempts have been made to develop mercury-free seed treating agents. The compounds and combinations hitherto proposed have the disadvantage, however, that they are effective only against part of the fungi concerned. Moreover, many of these compounds cause damage to the embryos which lead to considerable crop losses. In German Patent 1,140,392, for example, 3,3,4,4-tetrachlorotetrahydrothiophene-1,1-dioxide has been described as an effective compound for soil and seed treatment in pea cultivation (cf. also U.S. Patent 2,957,887). When this compound was used for treating cereals, for example wheat and barley, it has been found, however, that its phytotoxicity is too high in the range of concentration in which it is fully effective so that it cannot be used in practice as a so-called universal seed protectant.

The present invention provides seed protectants containing as active substance a combination of 3,3,4,4-tetrachlorotetrahydrothiophene-1,1-dioxide, in a ratio by weight within the range of 1:1 to 1:10, with pentachloronitrobenzene and/or tetrachloronitrobenzene and/or tetramethylthiuramdisulphide and/or N-trichloromethylmercaptotetrahydrophthalimide and/or hexachlorobenzene, and/or a manganese++ or zinc++ salt of ethylene-bis-dithiocarbamic acid.

The following examples illustrate the invention but they are not intended to limit it thereto, the parts being by weight.

As shown in the examples, the above combinations have a stronger action on the fungi than the individual constituents. The active substance combinations are applied in admixture with an inert substance.

EXAMPLE 1

Winter wheat infested with *Tilletia tritici* was treated with a preparation A containing as active substance 5 parts 3,3,4,4 - tetrachlorotetrahydrothiophene - dioxide combined with
15 parts pentachloronitrobenzene and
80 parts talcum as inert material.

For comparison there were used a preparation B containing as active substance 20 parts tetrachlorotetrahydrothiophene dioxide alone and
80 parts talcum as inert material and a preparation C containing as active substance 20 parts pentachloronitrobenzene alone and
80 parts talcum as inert material A commercial seed protectant containing 2% of mercury was used as comparison preparation D. Each formulated preparation was applied in a concentration of 100 g., 50 g. and 25 g., respectively, for 100 kg. of seed grains. The treatment was carried out in a conventional drum.

One day after the treatment, the seed grains were sown in lots of 2 m.$^2$ each with 5 repetitions. On harvesting, the sound ears and those infested with *Tilletia tritici* were counted and the figures so obtained were compared with those obtained in untreated control plants.

The results set forth in the following Table 1 show that combination A consisting of 3,3,4,4-tetrachlorotetrahydrothiophene-1,1-dioxide and pentachloronitrobenzene is not only superior to individual constituents B and C but also to the commercial mercury-containing product D in the low concentrations. Table 1 also shows that the plants were not damaged by preparation A whereas pronounced to strong phytotoxic symptoms were produced by preparation B.

TABLE 1

| Preparation | Infestation with *Tilletia tritici* in percent with g. of preparation per 100 kg. of seeds | | | Damages to plants with 100 g./100 kg. |
|---|---|---|---|---|
| | 100 g./100 kg. | 50 g./100 kg. | 25 g./100 kg. | |
| A | 0 | 0 | 0.2 | 0 |
| B | 8.7 | 10.3 | 18.6 | 2-3 |
| C | 1.4 | 4.2 | 7.4 | 0 |
| D | 0.5 | 1.9 | 4.7 | 0 |
| Untreated | 59.3 | 60.7 | 56 | 0 |

Damages to plants: 0=no damage, 5=plants died down.

EXAMPLE 2

Oats strongly infested artificially with *Ustilago avenae* (loose smut of oats) were treated with a preparation A containing as active substance 10 parts of 3,3,4,4-tetrachlorotetrahydrothiophene-1,1-dioxide combined with 20 parts of tetramethylthiuram disulphide (TMTD) and 70 parts of talcum as inert substance.

For comparison there were used a preparation B which contained as active substance 20 parts (higher concentrations cause too much damage to the plants) of 3,3,4,4-tetrachlorotetrahydrothiophene-1,1-dioxide with 80 parts of talcum as inert material, and a preparation C containing as active substance 30 parts of TMTD alone in addition to 70 parts of talcum. Furthermore, a commercial preparation containing 2% of mercury was used as comparison preparation D.

The seed grains were treated for 10 minutes with 100 g., 50 g. and 25 g., respectively, of the formulated preparations for 100 kg. of seed grains and sown after 24 hours in lots of 2 m.$^2$ each with 4 repetitions.

On harvesting, the comparison was evaluated and the numbers of sound panicles and panicles infested with loose smut were determined.

The average result obtained by the four repetitions is indicated in the following Table 2. It shows that the active substance combination A of the invention has a distinctly improved action against *Ustilago avenae* as compared with that of individual components B and C. It even shows that the action of active substance combination A is distinctly superior to that of mercury preparation D.

TABLE 2

| Preparation | Infestation of panicles in percent with concentrations of g. of preparation for 100 kg. of seed grains | | |
|---|---|---|---|
| | 100 g./100 kg. | 50 g./100 kg. | 25 g./100 kg. |
| A | 0 | 0.1 | 0.8 |
| B | 5.7 | 9.5 | 12.0 |
| C | 8.6 | 13.2 | 15.4 |
| D | 0.7 | 4.3 | 6.8 |
| Untreated | 23.2 | 29.6 | 26.3 |

EXAMPLE 3

Cotton seed strongly infested with *Rhizoktonia solani* was treated with a preparation A containing as active substance a combination of 10 parts 3,3,4,4-tetrachlorotetrahydrothiophene-1,1-dioxide with
60 parts N-trichloromethylmercaptotetrahydrophthalimide (captan) in addition to
30 parts talcum as carrier material.

For comparison there were used a preparation B containing as active substance 20 parts[1] 3,3,4,4-tetrachlorotetrahydrothiophene-1,1-dioxide alone in addition to
80 parts talcum and a preparation C containing 30 parts talcum as inert material and
70 parts N-trichloroethylmercaptotetrahydrophthtalimide (captan) as active substance.

A commercial seed protectant D containing 2% of mercury was also used for comparison.

The formulated preparations were used in concentrations of 400 g., 200 g. and 100 g., respectively, for 100 kg. of seed grains. The treatment lasted 10 minutes. The seed grains were sown in a hot-house in pots with six repetitions and the result was ascertained by the number of the sound plants that had germinated.

The result so obtained is indicated in the following Table 3. The table shows that combination A of the invention has a considerably improved action as compared with all the comparison preparations including mercury seed protectant D.

TABLE 3

| Preparation | Percent of germinated sound plants with concentrations of g. of preparation for 100 kg. of seed grains | | |
|---|---|---|---|
| | 400 g./100 kg. | 200 g./100 kg. | 100 g./100 kg. |
| A | 99 | 96 | 84 |
| B | 76 | 65 | 58 |
| C | 81 | 71 | 64 |
| D | 85 | 72 | 60 |
| Untreated | 50 | 49 | 51 |

EXAMPLE 4

Winter rye seeds naturally infested to a high degree with *Fusarium nivale* was treated with a preparation A containing as active substance a combination of 10 parts 3,3,4,4-tetrachlorotetrahydrothiophene-1,1-dioxide and
20 parts hexachlorobenzene in addition to
70 parts talcum as inert material.

[1] Higher concentrations cause too much damage to the plants.

For comparison, there were used a preparation B which contained as active substance 20 parts[1] 3,3,4,4-tetrachlorotetrahydrothiophene-dioxide alone and
80 parts talcum as inert material and a preparation C containing as active substance 30 parts hexachlorobenzene alone and
70 parts talcum as inert material.

A commercial seed protectant D containing 2% of mercury was also used as comparison preparation.

The formulated preparations were used in concentrations of 100 g., 50 g. and 25 g., respectively, for 100 kg. of seed grains. The treatment lasted 10 minutes.

24 hours after the treatment, the treated seed grains were sown in germination boxes with sterile garden mould with eight repetitions, each comprising 100 seed grains, and then caused to germinate under optimum infestation conditions in an air-conditioned room at a temperature of 5 to 8° C. and 90 to 100% of relative atmospheric moisture.

The evaluation of the experiment is set forth in the following Table 4. The table shows that the effectiveness of combination A is considerably higher than that of the individual components B and C and reaches that of the mercury seed protectant D.

This result is very surprising since the component hexachlorobenzene is almost ineffective against Fusarium when used alone, as can be seen from the table.

TABLE 4

| Preparation | Percent of infestation with Fusarium with concentrations of g. of preparation for 100 kg. of seed grains | | |
|---|---|---|---|
| | 100 g./100 kg. | 50 g./100 kg. | 25 g./100 kg. |
| A | 0 | 1.2 | 3.5 |
| B | 2.7 | 8.9 | 15.4 |
| C | 29.1 | 35.0 | 40.3 |
| D | 0.1 | 0.8 | 2.3 |
| Untreated | 63 | 51.7 | 53.4 |

EXAMPLE 5

Winter rye seeds naturally infested to a high degree with *Fusarium nivale* were treated with a preparation A containing as active substance a combination of 5 parts 3,3,4,4-tetrachlorotetrahydrothiophene-1,1-dioxide and
40 parts tetrachloronitrobenzene in addition to
55 parts talcum as inert material.

For comparison there were used a preparation B containing as active substance 20 parts[1] 3,3,4,4-tetrachlorotetrahydrothiophene-1,1-dioxide alone in addition to
80 parts talcum as insert material and a preparation C containing as active substance 45 parts tetrachloronitrobenzene alone in addition to
55 parts talcum as inert material.

A commercial seed protectant D containing 2% of mercury was also used as comparison preparation.

The formulated preparations were applied in concentrations of 100 g., 50 g. and 25 g., respectively, for 100 kg. of seed grains.

One day after the treatment the seed grains were sown in the usual germination boxes filled with sterile garden mould and caused to germinate under optimum infestation conditions in an air-conditioned room at a temperature of 5 to 8° C. and a relative atmosphere mositure of 90 to 100%.

[1] Higher concentrations cause too much damage to the plants.

An evaluation of this experiment shows that the effectiveness of combination A is superior to that of comparison preparations B and C and is equal to that of mercury seed dressing D.

TABLE 5

| Preparation | Percent of infestation with Fusarium with concentrations of g. of preparation for 100 kg. of seed grain | | |
|---|---|---|---|
| | 100 g./100 kg. | 50 g./100 kg. | 25 g./100 kg. |
| A | 0 | 0.3 | 1.8 |
| B | 2.7 | 7.2 | 17.3 |
| C | 8.9 | 20.6 | 28.3 |
| D | 0 | 0.8 | 1.3 |
| Untreated | 57.3 | 54.8 | 59.3 |

EXAMPLE 6

Oats artificially infested with *Ustilago avenae* were treated with a preparation A containing as active substance 10 parts 3,3,4,4-tetrachlorotetrahydrothiophene-1,1-dioxide with
10 parts pentachloronitrobenzene and
30 parts hexachlorobenzene in addition to
50 parts talcum as inert material.

For comparison there were used a preparation B containing as active substance 20 parts [1] 3,3,4,4-tetrachlorotetrahydrothiophene-1,1-dioxide alone in addition to
80 parts talcum as insert material and a preparation C containing as active substance 15 parts pentachloronitrobenzene together with
35 parts hexachlorobenzene in addition to
50 parts talcum.

The seed grains were treated in usual manner for 10 minutes in a conventional drum. Each formulated preparation was applied in a concentration of 300 g., 200 g., 100 g. and 50 g., respectively, for 100 kg. of seed grains. The seed grains were sown in a hot-house in boxes filled with earth, with four repetitions, each comprising 100 seed grains. On harvesting, the test was evaluated and the numbers of sound panicles and infested panicles were determined.

The test result indicated in the following Table 6 shows that the active substance combination A in accordance with the invention has a considerably improved action against *Ustilago avenae* in comparison with that of comparison preparations B and C.

TABLE 6

| Preparation | Infestation of panicles with *Ustilago avenae* in percent with g. of preparation for 100 kg. of seed grains | | | |
|---|---|---|---|---|
| | 300 g./100 kg. | 200 g./100 kg. | 100 g./100 kg. | 50 g./100 kg. |
| A | 0 | 0 | 0 | 0.8 |
| B | 4.0 | 9.3 | 12.7 | 21.5 |
| C | 29.6 | 38.4 | 50.4 | 59.3 |
| Untreated | 60.5 | 57.3 | 54.6 | 62.4 |

EXAMPLE 7

Cotton seed infested with *Rhizoktonia solani* was treated with a preparation A containing an active substance combination of 5 parts 3,3,4,4-tetrachlorotetrahydrothiophene-1,1-dioxide
20 parts N-trichloromethylmercaptotetrahydrophthalimide and
30 parts tetramethylthiuramdisulfide as active substance and
45 parts talcum as inert material.

For comparison, there were used a preparation B containing as active substance

[1] Higher concentrations cause too much damage to the plants.

20 parts [1] 3,3,4,4-tetrachlorotetrahydrothiophene-1,1-dioxide and
80 parts talcum as inert material and a preparation C containing as active substance combination 25 parts N-trichloromethylmercaptotetrahydrophthalimide with
30 parts tetramethylthiuramdisulfide and
45 parts talcum as inert material.

Seed grains were treated for 10 minutes in a drum. For 100 kg. of seed grains 400 g., 200 g., 100 g., and 50 g., respectively, of the formulated preparations were used. The seed grains were then sown in a hot-house in boxes filled with earth with four repetitions, each comprising 100 seed grains. The percentage of sound plants is indicated in the following Table 7. The table shows to which extent infestation could be prevented by treatment with the different active substance combinations. The combination of preparation A was most effective. Preparation B was considerably less effective and preparation C was still less effective.

TABLE 7

| Preparation | Percent of germinated sound plants with concentrations of g. of preparation for 100 kg. of seed grains | | | |
|---|---|---|---|---|
| | 400 g./100 kg. | 200 g./100 kg. | 100 g./100 kg. | 50 g./100 kg. |
| A | 98.5 | 99.0 | 92.3 | 81.0 |
| B | 70.2 | 69.3 | 60.4 | 50.2 |
| C | 65.3 | 59.6 | 50.0 | 43.2 |
| Untreated | 40.7 | 41.2 | 39.8 | 38.2 |

EXAMPLE 8

Winter rye naturally infested with *Fusarium nivale* was treated with a preparation A containing as active substance a combination of (a) 5 parts 3,3,4,4 - tetrachlorotetrahydrothiophene - 1,1-dioxide with
30 parts manganese-(II)-ethylene-bis-dithiocarbamate and
65 parts talcum as inert material.
(b) There was also used a preparation B containing, instead of manganese-(II)-ethylene-bis-dithiocarbamate, 30 parts zinc-(II)-ethylene-bis-dithiocarbamate, while otherwise having the same composition as preparation A.

For comparison there were used a preparation C containing as active substance 20 parts [1] 3,3,4,4 - tetrachlorotetrahydrothiophene-1,1-dioxide alone in addition to
80 parts talcum as inert material and a preparation D containing as active substance 35 parts manganese - (II)-ethylene-bis-dithiocarbamate alone in addition to
65 parts talcum and furthermore a preparation E containing as active substance 35 parts zinc-(II)-ethylene-bis-dithiocarbamate alone and
65 parts talcum as inert material.

The formulated preparations were used in concentrations of 200 g., 100 g., 50 g. and 25 g., respectively, for 100 kg. of seed grains. The treatment lasted 10 minutes.

24 hours after the treatment, the seed grains were sown in boxes filled with sterile garden mould with four repetitions, each comprising 100 seed grains and then caused to germinate under optimum infestation conditions in an air-conditioned room at a temperature of 5 to 8° C. and 90 to 100% of relative atmospheric moisture.

[1] Higher concentrations cause too much damage to the plants.

The result indicated in the following Table 8 shows that active substance combinations A and B in accordance with the invention are essentially more effective than the individual components.

TABLE 8

| Preparation | Percent of infestation with Fusarium with concentrations of g. of preparation for 100 kg. of seed grains | | | |
|---|---|---|---|---|
| | 200 g. | 100 g. | 50 g. | 25 g. |
| A | 0 | 0 | 0.8 | 2.6 |
| B | 0 | 0.3 | 1.8 | 3.9 |
| C | 1 | 3.8 | 10.4 | 17.9 |
| D | 6.2 | 12.3 | 18.7 | 30.2 |
| E | 10.3 | 20.6 | 35.4 | 50.7 |
| Untreated | 61 | 63.2 | 56.3 | 58.6 |

EXAMPLE 9

Oats strongly infested with *Helminthosporium avenae* was treated with a preparation A containing as active substance a combination of 8 parts 3,3,4,4-tetrachlorotetrahydrothiophene-1,1-dioxide with
20 parts manganese-(II)-ethylene-bis-dithiocarbamate and
72 parts talcum as inert material.

There was also used a preparation B containing as active substance zinc-(II)-ethylene-bis-dithiocarbamate instead of manganese-(II)-ethylene-bis-dithiocarbamate, while otherwise having the same composition.

For comparison there were used a preparation C containing 20 parts [1] 3,3,4,4, - tetrachlorotetrahydrothiophene - 1,1-dioxide alone as active substance in addition to
80 parts talcum as inert material and a preparation D containing 28 parts manganese - (II) - ethylene-bis-dithiocarbamate alone as achieve substance in addition to
72 parts talcum as inert material
and furthermore a preparation E containing 28 parts zinc-(II)-ethylene-bis-dithiocarbamate alone as active substance in addition to
72 parts talcum as inert material.

The formulated preparations were used in concentrations of 300 g., 200 g., 100 g. and 50 g., respectively, for 100 kg. of seed grains. The treatment lasted 10 minutes.

One day after the treatment the seed grains were sown in boxes filled with sterile garden mould with four repetitions, each comprising 100 seed grains, and then caused to germinate in a hot-house.

The test result indicated in the following Table 9 shows that the active substance combinations in accordance with the invention have an essentially improved action in comparison with the individual components.

TABLE 9

| Preparation | Percent of infestation with *Helminthosporium avenae* with concentrations of g. of preparation for 100 kg. of seed grains | | | |
|---|---|---|---|---|
| | 300 g. | 200 g. | 100 g. | 50 g. |
| A | 0 | 0 | 1.3 | 2.5 |
| B | 0 | 0.2 | 2.1 | 3.6 |
| C | 2.3 | 5.8 | 14.7 | 23.8 |
| D | 5.4 | 12.1 | 20.4 | 36.9 |
| E | 7.3 | 20.4 | 28.6 | 39.2 |
| Untreated | 43.4 | 50.2 | 41.6 | 40.5 |

EXAMPLE 10

Oats artificially infested with *Ustilago avenae* were treated with a preparation A having the following composition 10 parts 3,3,4,4 - tetrachlorotetrahydrothiophene - 1,1-dioxide with
10 parts pentachloronitrobenzene and
30 parts manganese-(II)-ethylene-bis-dithiocarbamate in addition to
50 parts talcum as inert material.

For comparison, there were used a preparation B containing as active substance 20 parts [1] 3,3,4,4 - tetrachlorotetrahydrothiophene - 1,1-dioxide alone in addition to
80 parts talcum as inert material and a preparation C containing 15 parts pentachloronitrobenzene together with
35 parts manganese-(II)-ethylene-bis-dithiocarbamate in addition to
50 parts talcum as inert material.

The seed grains were treated for 10 minutes in usual manner in a conventional drum. The formulated preparations were used in concentrations of 300 g., 200 g., 100 g. and 50 g., respectively, for 100 kg. of seed grains. The seed grains were sown in boxes filled with earth in a hothouse with four repetitions, each comprising 100 seed grains. On harvesting, the comparison was evaluated and the numbers of sound panicles and infested panicles were determined.

The test result indicated in the following Table 10 shows that the active substance combinations in accordance with the invention have a considerably improved action against *Ustilago avenae* in comparison with that of the individual components.

TABLE 10

| Preparation | Percent of panicles infested with *Ustilago avenae* with g. of preparation for 100 kg. of seed grains | | | |
|---|---|---|---|---|
| | 300 g. | 200 g. | 100 g. | 50 g. |
| A | 0 | 0 | 0 | 0.2 |
| B | 3.8 | 7.9 | 10.6 | 19.2 |
| C | 7.5 | 12.3 | 21.6 | 28.5 |
| Untreated | 63.4 | 59.7 | 50.8 | 61.2 |

We claim:

1. Composition of matter consisting essentially of a mixture of 3,3,4,4 - tetrachlorotetrahydrothiophene-1,1-dioxide in a ratio by weight within the range of 1:1 to 1:10 with a member of the group consisting of pentachloronitrobenzene, tetrachloronitrobenzene, tetramethylthiuramdisulfide and the manganous salt of ethylene-bis-dithiocarbamic acid.

2. Composition consisting essentially of a mixture of 3,3,4,4 - tetrachlorotetrahydrothiophene-1,1-dioxide with pentachloronitrobenzene in a ratio by weight within the range of 1:1 to 1:10.

3. Composition consisting essentially of a mixture of 3,3,4,4 - tetrachlorotetrahydrothiophene-1,1-dioxide with tetrachloronitrobenzene in a ratio by weight within the range of 1:1 to 1:10.

4. Composition consisting essentially of a mixture of 3,3,4,4 - tetrachlorotetrahydrothiophene-1,1-dioxide with hexachlorobenzene in a ratio by weight of about 1:2.

5. Composition consisting essentially of a mixture of 3,3,4,4 - tetrachlorotetrahydrothiophene-1,1-dioxide with tetramethylthiuramdisulfide in a ratio by weight within the range of 1:1 to 1:10.

6. Composition consisting essentially of a mixture of 3,3,4,4 - tetrachlorotetrahydrothiophene-1,1-dioxide with N - trichloromethylmercaptotetrahydrophthalimide in a ratio by weight of about 1:6.

7. Composition consisting essentially of a mixture of 3,3,4,4 - tetrachlorotetrahydrothiophene-1,1-dioxide with hexachlorobenzene and pentachloronitrobenzene in a ratio by weight of about 1:3:1.

---

[1] Higher concentrations cause too much damage to the plants.

8. Composition consisting essentially of a mixture of 3,3,4,4 - tetrachlorotetrahydrothiophene-1,1-dioxide with tetramethylthiuramdisulfide and N - trichloromethyl-mercaptotetrahydrophthalimide in a ratio by weight of about 1:6:4.

9. Composition consisting essentially of a mixture of 3,3,4,4 - tetrachlorotetrahydrothiophene-1,1-dioxide with manganous-ethylene-bis-dithiocarbamate in a ratio by weight within the range of 1:1 to 1:10.

10. Composition consisting essentially of a mixture of 3,3,4,4 - tetrachlorotetrahydrothiophene-1,1-dioxide with manganous - ethylene - bis - dithiocarbamate and pentachloronitrobenzene in a ratio by weight of about 1:3:1.

11. Composition consisting essentially of a mixture of 3,3,4,4 - tetrachlorotetrahydrothiophene-1,1-dioxide with zinc - (II) - ethylene-bis-dithiocarbamate in a ratio by weight of about 1:2.5 to 1:6.

12. Seed protectant composition containing, in addition to an inert carrier material, a mixture of (A) 3,3,4,4-tetrachlorotetrahydrothiophene - 1,1-dioxide with (B) pentachloronitrobenzene, tetrachloronitrobenzene, tetramethylthiuramdisulfide or manganous ethylene-bis-dithiocarbamate, components A and B being present in a weight ratio of 1:1 to 1:10.

13. A method of protecting seeds comprising applying to said seeds a composition as defined in claim 12.

References Cited

UNITED STATES PATENTS 2,957,887  10/1960  Berkey _____ 260—332.1

OTHER REFERENCES

Frear, Pesticide Index (1961), 1st ed., p. 175.
Frear, Pesticide Index (1963), 2nd ed., pp. 47, 142, 155, 181, 214 and 226–227.

ALBERT T. MEYERS, Primary Examiner

S. J. FRIEDMAN, Assistant Examiner

U.S. Cl. X.R.

424—275, 286, 287, 336, 349, 353